US008700679B2

(12) United States Patent
Nagel et al.

(10) Patent No.: US 8,700,679 B2
(45) Date of Patent: Apr. 15, 2014

(54) CLASSIC TO IN-MEMORY CUBE CONVERSION (75) Inventors: Klaus Nagel, Walldorf (DE); Martin Richtarsky, Walldorf (DE); Achim Seubert, Walldorf (DE)

(73) Assignee: SAP AG, Walldorf (DE)

(*) Notice: Subject to any disclaimer, the term of this patent is extended or adjusted under 35 U.S.C. 154(b) by 23 days.

(21) Appl. No.: 13/449,038

(22) Filed: Apr. 17, 2012

(65) Prior Publication Data

US 2013/0275362 A1 Oct. 17, 2013

(51) Int. Cl.
*G06F 17/30* (2006.01)
(52) U.S. Cl.
USPC .......................................... 707/803
(58) Field of Classification Search
USPC ........................................ 707/602, 999.101
See application file for complete search history.

(56) References Cited

U.S. PATENT DOCUMENTS

| | | | | |
|---|---|---|---|---|
| 6,714,979 B1* | 3/2004 | Brandt et al. | ............... | 709/225 |
| 7,523,124 B2* | 4/2009 | Lavdas et al. | ............... | 1/1 |
| 7,779,042 B1* | 8/2010 | Bland et al. | ............... | 707/802 |
| 7,840,607 B2* | 11/2010 | Henigman et al. | ............... | 707/803 |
| 7,885,953 B2* | 2/2011 | Chen et al. | ............... | 707/713 |
| 8,219,521 B2* | 7/2012 | Lavdas et al. | ............... | 707/606 |
| 8,510,259 B2* | 8/2013 | Binstock et al. | ............... | 707/602 |
| 2009/0281985 A1* | 11/2009 | Aggarwal | ............... | 707/999.002 |
| 2011/0208692 A1* | 8/2011 | Satpathy et al. | ............... | 707/606 |

FOREIGN PATENT DOCUMENTS

WO    WO 2005076160 A1 *  8/2005

OTHER PUBLICATIONS

Lekkala, F and E Fact Tables, SAP Community Network, 1st response from Paulo Junior posted Aug. 31, 2010. Retrieved on Jun. 29, 2013 from http://scn.sap.com/thread/1772764.*
Ekoy, Basis Cube, Learn My SAP, posted Dec. 24, 2009. Retrieved on Jun. 29, 2013 from http://learnmysap.com/sap-bw/198-basis-cube.html.*
Iniu Consulting, "Define star schema over the snowflake data model data source", posted Sep. 10, 2009. Retrieved on Jun. 21, 2013 from http://iniu.net/content/obiee-define-star-schema-over-snowflake-data-model-data-source/.*

* cited by examiner

*Primary Examiner* — Cam-Linh Nguyen
(74) *Attorney, Agent, or Firm* — Fountainhead Law Group PC (57) ABSTRACT Conversion of a snowflake-like schema to a star-like schema includes a distribution of the snowflake-like schema across several host computer systems. Each host computer system has a fragment of the snowflake-like schema, including a fragment of constituent fact tables. Dimension keys in the fact table fragments are mapped to data tables via the constituent dimension tables. Data table keys are identified and populate the fact table for the converted star-like schema, thus obviating the dimension tables in the converted star-like schema.

20 Claims, 8 Drawing Sheets

CLASSIC TO IN-MEMORY CUBE CONVERSION

BACKGROUND

Unless otherwise indicated herein, the approaches described in this section are not prior art to the claims in this application and are not admitted to be prior art by inclusion in this section.

Business analytics (BA) refers to the iterative methodical exploration of an enterprise's data; e.g., using statistical analysis and forecasting tools. BA facilitates data-driven decision making, providing insight that may inform business decisions and can be used to automate and optimize business processes. Enterprise data is required to support the analysis. Acquisition of enterprise data often involves extraction from one or more business systems, cleansing, and integration into a single repository such as a data warehouse, and in particular data marts for specific uses of the enterprise data.

Multidimensional data models for analytic applications are typically represented on a classic relational database management system (RDBMS) such as star schemas. Designing, developing and maintaining a proper star schema implementation is one of the most challenging tasks for BA. A bad design may have direct negative impact on data load and query performance. However, modern in-memory databases, such as the SAP® HANA computing platform, raise the question whether the strong link between logical multidimensional data models and a given database implementation such as a star schema still holds.

DETAILED DESCRIPTION

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Methods and systems in accordance with embodiments of the present disclosure provide for conversion of a Data Mart. In particular, the Data Mart to be converted has a snowflake schema styled organization. An example of such a Data Mart is SAP® InfoCube. The format of a Data Mart converted in accordance with the present disclosure is referred to as a star schema styled organization. An example of such a star schema styled Data Mart is SAP® HANA-Optimized InfoCube. Merely for purposes of illustration, these specific examples will be used to facilitate the following discussion of embodiments in accordance with principles of the present disclosure.

Figure 1:
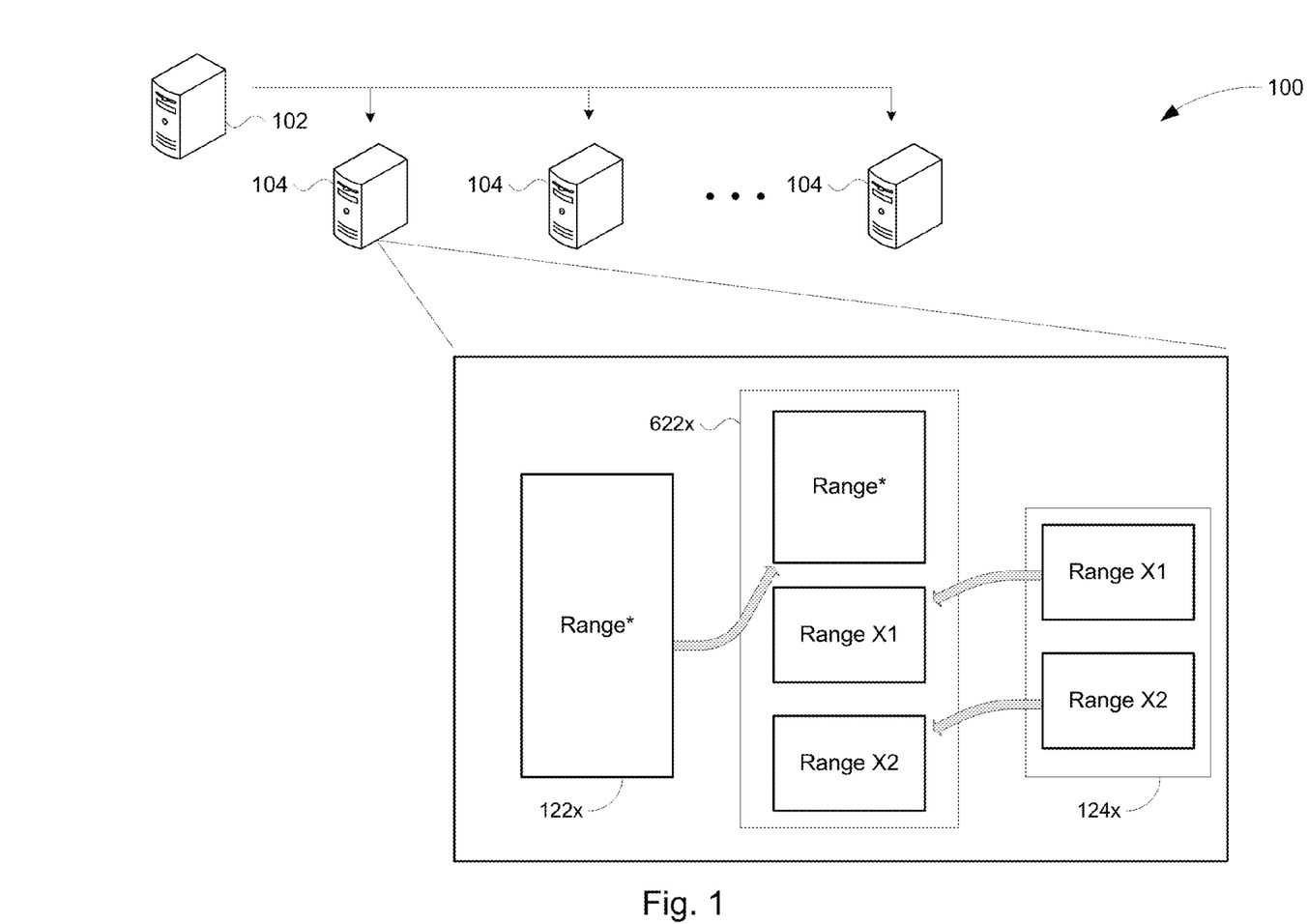
FIG. 1 shows a distributed architecture for converting a Data Mart having a snowflake type of schema to a star type of schema.

FIG. 1 shows, in some embodiments, a computing system 100 for converting a Data Mart. The computing system 102 includes an administrative computer 102 and one or more host computer systems 104. In some embodiments, the administrative computer 102 may be instanced in one of the host computer systems 104, for example, running an administrative application on the host computer system. The particular embodiment of FIG. 1, however, shows the administrative computer 102 as a computer that is separate from the host computer systems 104. As will be discussed in more detail below, the Data Mart may be distributed among the several host computer systems 104.

Figure 1A:
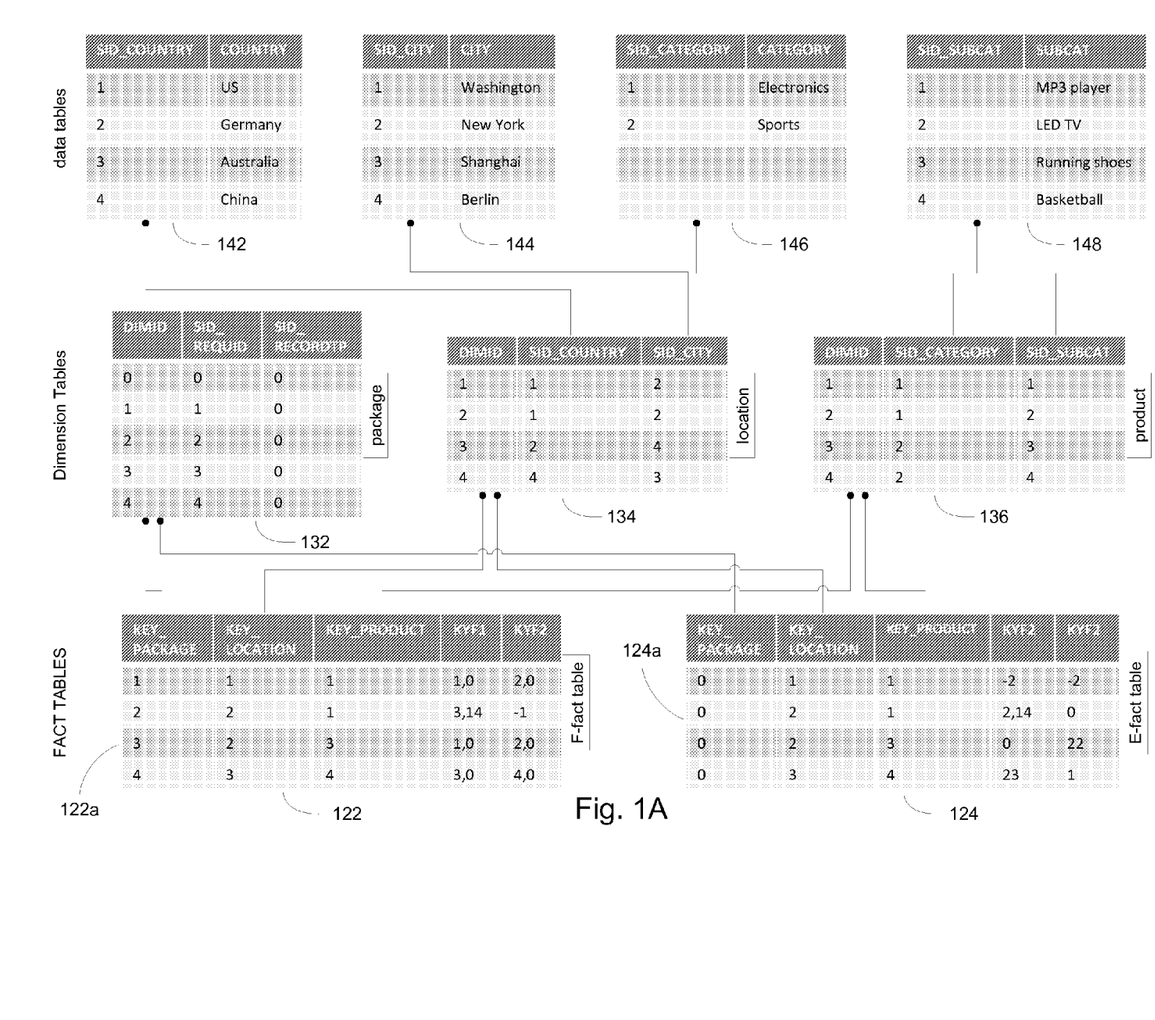
FIG. 1A shows an example of a Data Mart having a snowflake type schema.

Referring for a moment to FIG. 1A, an illustrative example of a Data Mart is shown. The particular example shows an SAP® InfoCube style Data Mart which is modeled on an extended star schema organization referred to as a snowflake schema. The Data Mart includes fact tables 122 and 124 and dimension tables 132, 134, and 136. The fact tables 122, 124 contain "fact data," which are the focus of any analysis of business activity. Fact data are measures of activities performed by the business such as number of units sold, weekly revenue, production yields, inventory levels, sales commissions, and so on. In the SAP® InfoCube, fact data may be referred to as "key figures." FIG. 1A shows that fact tables 122 and 124 each have two columns of key figures, called KYF1 and KYF2.

The fact tables 122, 124 also include dimension keys which point to the dimension tables 132-136. For example, fact tables 122, 124 each have dimension keys called KEY_LOCATION and KEY_PRODUCT. The KEY_LOCATION dimension key points to the "location" dimension table 134, and the KEY_PRODUCT dimension key points to the "product" dimension table 136. The fact tables 122, 124 also include a dimension key called KEY_PACKAGE that points to a "package" dimension table 132. The package dimension table 132 provides internal information to facilitate managing reading and writing the Data Mart.

The dimension tables 134 and 136 serve to connect the fact tables 122, 124 to the data tables 142-148. In the particular example of an SAP® InfoCube, the data tables 142-148 are the master data tables of the business enterprise. The dimension tables 134, 136 include keys called surrogate identifiers (SIDs) which point to respective data tables 142-148. For example, the location dimension table 134 includes SIDs for a "country" data table 142 and a "city" data table 144. The product dimension table 136 includes SIDs for a "category" data table 146 and a "subcategory" data table 148. The dimension tables 134, 136 therefore provide linkage to the data tables 142-148. For example, row 122a in fact table 122 refers to "running shoes (sports)" in "New York (U.S.)." Likewise, row 124a in fact table 124 refers to "MP3 player (electronics)" in "New York (U.S.)."

The dimension key called KEY_PACKAGE points to a special dimension table in the SAP® InfoCube called a "package" dimension table. The package dimension table stores identifiers for requests. This dimension table is an internal system-level table used to manage requests and maintain integrity of the Data Mart.

In the particular example of the SAP® InfoCube, the fact tables 122, 124 comprise an F-fact table 122 and an E-fact table 124. The F- and E-fact tables 122, 124 relate to whether a request is compressed or not. When requests are not compressed, the data exists in the F-fact table 122, and when the requests are compressed the data lies in the E-fact table 124. When the requests are compressed, all the request identifiers are lost (e.g., set to NULL), and hence the KEY_PACKAGE dimension keys in the E-fact table 124 are "0".

Returning to FIG. 1, a Data Mart in a business enterprise, over time, can reach a size where a single computer cannot effectively or practically manage the data and/or conduct analyses on the data. Accordingly, the Data Mart may be distributed across the several host computer systems 104 in order to distribute the processing load. In some embodiments, the fact tables 122, 124 may be divided into fragments. For example, the fact tables 122, 124 may be apportioned into fragments of N rows each. Each fragment of fact tables may then be handed over to a host computer system 104. The host computer systems 104 can coordinate the processing of requests to provide a logical view of a single Data Mart. FIG. 1 shows, in a given host computer system 104, that the host computer contains a fragment of the Data Mart shown in FIG. 1A, comprising a fragment 122*x* of fact table 122 and a fragment 124*x* of fact table 124. The fragment 622*x* shown in FIG. 1 represents a fragment of a converted destination Data Mart (discussed below), and in particular a fragment of a fact table 622 (FIG. 6) of the destination Data Mart.

Figure 2:
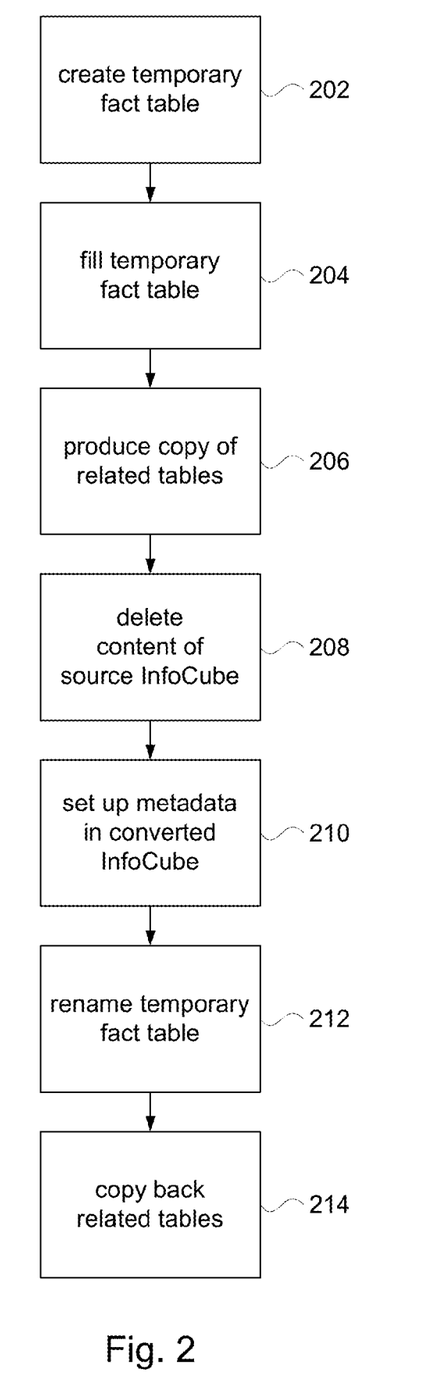
FIG. 2 shows a flow chart of a framework for a conversion process in accordance with the present disclosure.
Figure 3:
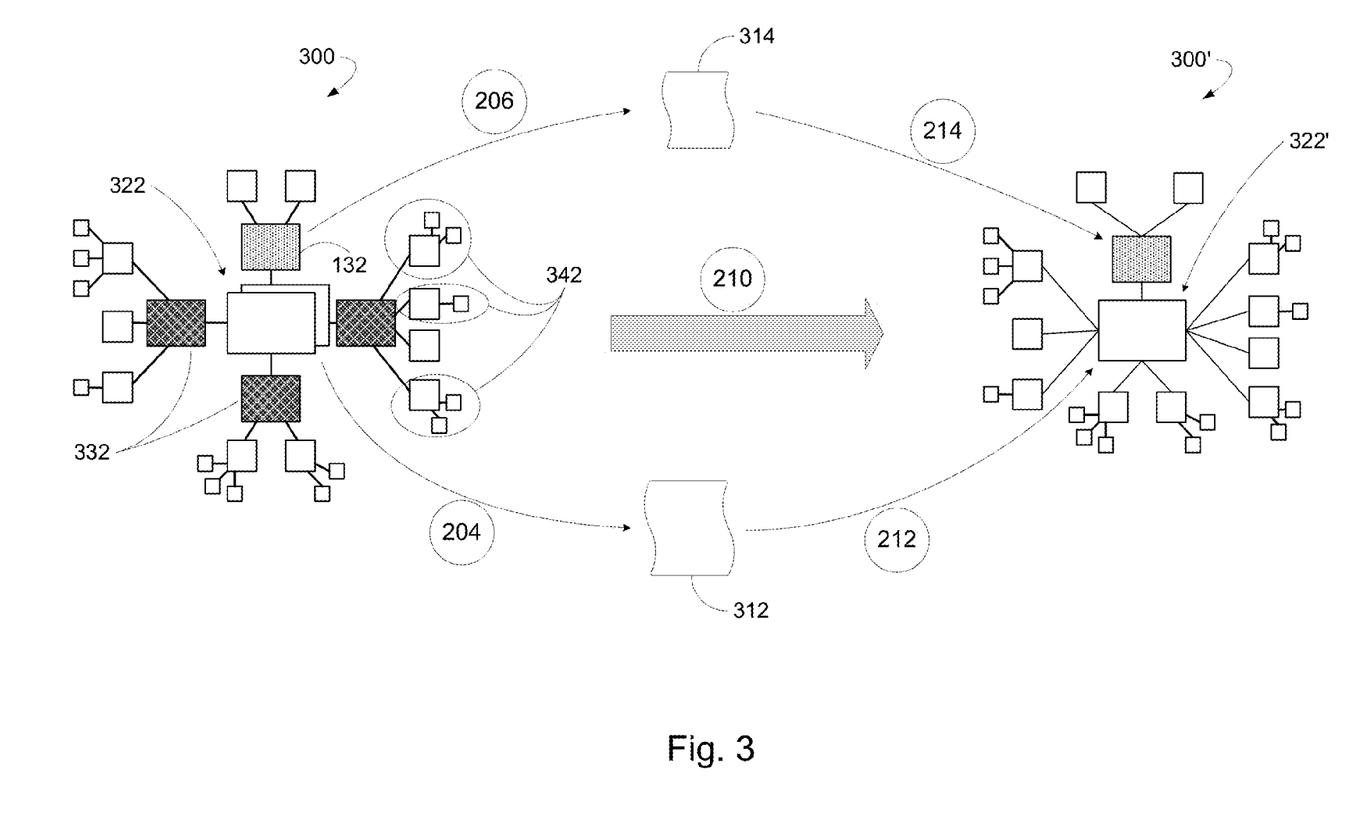
FIG. 3 illustrates workflow described in FIG. 2.

FIGS. 2 and 3 illustrate, in some embodiments, a framework for a work flow to convert a Data Mart having a snowflake schema styled organization into a converted Data Mart having a star schema styled organization. The term "source Data Mart" will be used to refer to the original pre-converted version of the Data Mart, while the term "destination Data Mart" will be understood to refer to the converted version of the Data Mart. Merely for purposes of explanation, a Data Mart based on the SAP® InfoCube (e.g., FIG. 1A) will serve as an illustrative example of the source Data Mart. Similarly, a Data Mart based on the SAP® HANA-Optimized InfoCube (e.g., FIG. 6) will serve as an illustrative example of the destination Data Mart.

Thus, in a step 202 a temporary fact table 312 is created. The temporary fact table 312 is for the destination Data Mart 300'. In particular, the temporary fact table is the fact table of the star schema structure that comprises the destination Data Mart 300'. As shown in FIG. 3, a source Data Mart 300 may comprise fact tables 322 and dimension tables 332 which provide linkage between the fact tables and data tables 342. A particular example of fact tables 322 are fact tables 122, 124 in FIG. 1A. A particular example of dimension tables 322 are dimension tables 132-134, and data tables 142-148 in FIG. 1A represent an example of dimension tables 342.

As mentioned above, the source Data Mart 300 may have a distributed structure that is distributed across several host computers 104. Accordingly, each host computer system 104 may have a fragment of the fact tables 322 comprising the source Data Mart 300. Accordingly, step 202 may include each host computer system 104 (FIG. 1) creating a temporary fact table which corresponds to the fragment of fact tables of the source Data Mart being hosted. In a step 204, the temporary fact table 312 is filled in accordance with processing of the present disclosure, details of which will be discussed below.

In a step 206, auxiliary data tables in the source Data Mart 300 other than the fact tables 322 are copied to corresponding auxiliary data tables in the destination Data Mart 300'. In some embodiments, auxiliary data tables may include the package dimension table (132, FIGS. 1A, 3) and other data tables such as validity data tables (not shown). These auxiliary data tables may be copied to a buffer 314 as a temporary holding area.

In a step 208, data tables in the source Data Mart 300 are emptied or cleared before the converted destination Data Mart can be brought online In some embodiments, this means zeroing out (clear) the fact tables 322 of the source Data Mart 300; e.g., the F-fact table 122 (FIG. 1A) and the E-fact table 124. In the case where the source Data Mart 300 is distributed, each host computer system 104 will zero out its fragment of fact tables. In some embodiments, step 208 includes zeroing out the dimension tables 332, in addition to the fact tables 322. On the other hand, the data tables 342 may comprise the master data of the entire business enterprise. Accordingly, other Data Marts may link to the data tables 342 and so the data in these tables should be retained and not cleared.

In a step 210, various metadata from the source Data Mart 300 are copied to the destination Data Mart 300'. The metadata may be used to describe special aspects of the data in the fact table. For example, when a row of data is marked as "deleted", but has not been removed from the Data Mart, metadata may be used to designate such rows as "invisible" so they are not displayed or otherwise accessed during analysis. In some embodiments, the metadata may be copied directly into the destination Data Mart 300', and thus do not require an intermediate temporary file or buffer.

Up to this point, the fact table 322' in the destination Data Mart 300' is empty. Recall in step 204 that the fact tables 322 from the source Data Mart 300 were copied into the temporary fact table 312. In a step 212, the temporary fact table 312 may be "inserted" into the destination Data Mart 300' by replacing the empty fact table 322'. In an embodiment, for example, the file(s) that constitute the empty fact table 322' in the destination Data Mart 300' may be deleted, and the file(s) that constitute the temporary fact table 312 may be renamed to those of the deleted files. Similarly, in step 214, the auxiliary data tables (e.g., package dimension table 132, FIG. 1A) stored in the buffer 314 (step 206) are inserted into the destination Data Mart 300'. The source Data Mart 300 is now deemed to have been converted to the destination Data Mart 300'.

Figure 4:
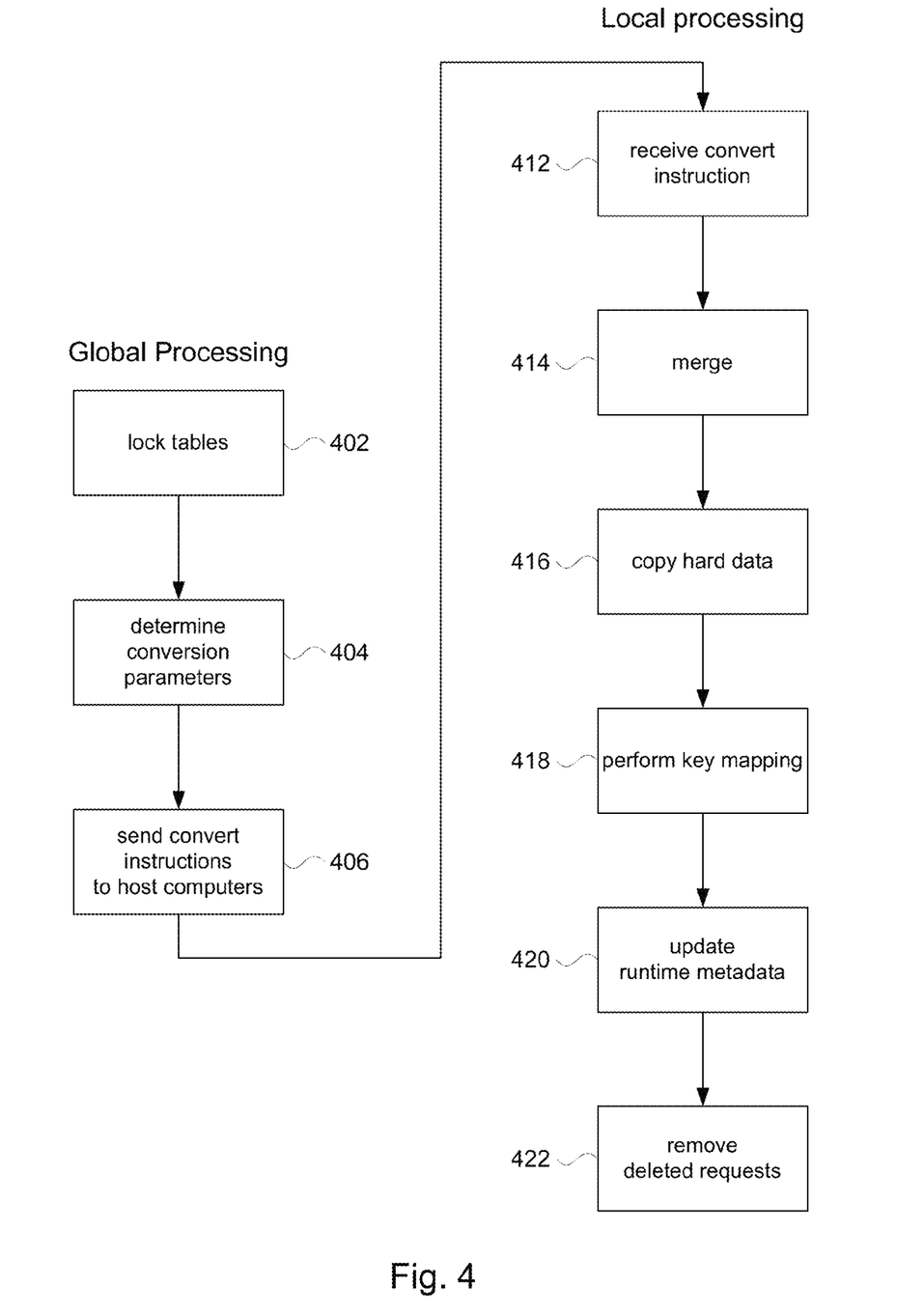
FIG. 4 illustrates global-level processing and local-level processing in accordance with the present disclosure.

Referring to FIG. 4, additional details of the foregoing processing will now be discussed. In a step 402, the various data tables comprising the source Data Mart (e.g., 300, FIG. 3) are "locked" to prevent activities such load processing, various maintenance functions, and the like. In other words, the source Data Mart 300 becomes read-only; i.e., querying on the Data Mart is possible during this time. Locking the data tables maintains consistency during the conversion process. In the case of a distributed source Data Mart, a lock instruction may be sent to each host computer system (e.g., 104, FIG. 1). In a step 404, conversion parameters are determined. The conversion parameters specify various information needed to control the conversion process. For example, the conversion parameters may identify the source Data Mart. The conversion parameters may specify the key figure columns (e.g., KYF1, FIG. 1A), the dimension columns, and various internal attributes that need to be copied. In a step, 406, a convert instruction is sent to each host computer system 104 that hosts a fragment of the source Data Mart, thus initiating the conversion process in the host computer system.

These foregoing steps 402-406 may be performed by an administrative computer. These steps are global-level processing steps that relate to the source Data Mart as a whole. In some embodiments, the administrative computer may be a separate computer as shown, for example, in FIG. 1 by computer 102. In some embodiments, these administrative functions may be performed by a computer that also hosts a fragment of the source Data Mart.

Continuing with FIG. 4, the discussion will now turn to the local processing (steps 412-422) that takes place in each host computer system 104. Each fragment of the Data Mart can be processed independently of the other fragments. Accordingly, the processing in one host computer system is asynchronous with respect to the other host computer system 104. As shown in FIG. 1, a host computer system 104 will convert its fact table fragments 122x, 124x from the source Data Mart to produce a corresponding fact table fragment 622x of the destination Data Mart. Thus, in a step 412, each host computer system 104 may receive the convert instruction, including conversion parameters. The host computer system 104 may then lock the source Data Mart fragment that it is hosting, as identified in the conversion parameters for example.

In a step 414, the host computer system 104 may perform a merge operation. In a particular embodiment, HANA stores the data of a data table in two parts. One part is a compressed, read-optimized "main" part. The other part is a write-optimized, uncompressed "delta" part. The direct copy of columns can only be done for data contained in the "main" part. This merge step moves all the data from the "delta" part to the "main" part to ensure that all the data are copied.

In a step 416, a "direct" copy of data from the source Data Mart 300 to the destination Data Mart 300' may include copying the columns of key figures (e.g., KYF1, KYF2, FIG. 1A) from the source fact tables into the temporary fact table 312. Direct copying may include copying other internal data from the source side to the destination side, such as ".bin" files and so on.

Figure 5:
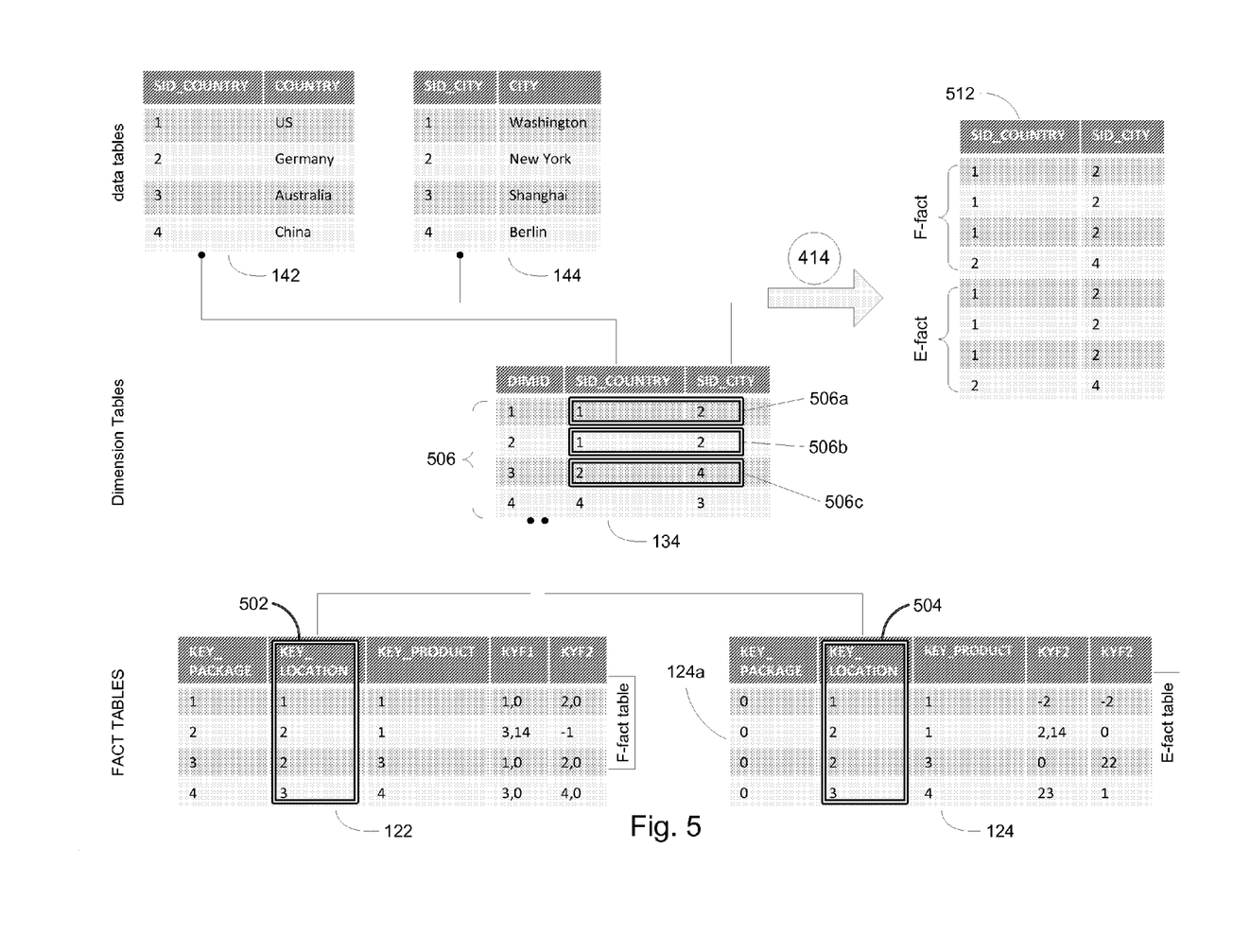
FIG. 5 illustrates map processing in accordance with the present disclosure.

In a step 418, key mapping is performed to replace dimension keys (e.g., KEY_LOCATION, KEY_PRODUCT) in the source fact tables with data table keys from the data tables. Referring to FIG. 5, a mapping sequence in accordance with the present disclosure is explained. For example, dimension keys 502 in the fact table 122 point to entries 506 in the location dimension table 134. The entries 506a, 506b, 506c pointed to by the fact table 122 are copied out and stored into corresponding rows in buffer table 512. Similarly, the entries in location dimension table 134 pointed to by dimension keys 504 in the fact table 124 are copied and stored into corresponding rows in the buffer table 512. The buffer table 512 represents the mapping that is provided by the location dimension table 134. The buffer table 512 then replaces the column of dimension keys 502 in the temporary fact table 312 (FIG. 3). Since the dimension keys 502 are replaced, the location dimension table 134 serves no purpose in the destination Data Mart 300', and thus may be deleted.

A similar key mapping may be performed in the fact tables 122, 124 for each dimension table that the fact tables point to. For example, a key mapping would be performed for the KEY_PRODUCT dimension key in each fact table 122, 124, using the product dimension table (136, FIG. 1A). A buffer table (not shown) would be created that contains two columns, SID-CATEGORY and SID_SUBCAT. The buffer table would replace the column of KEY_PRODUCT dimension keys in the temporary fact table 312, and so the product dimension table 136 (FIG. 1A) may be deleted since it will no longer be needed in the destination Data Mart.

In some embodiments, the destination Data Mart may use a single fact table (e.g., 622, FIG. 6) as compared to the two fact tables in the source Data Mart (e.g., 122, 124, FIG. 1A). Accordingly, when the F-fact table from the source Data Mart is processed, the results of the processing (e.g., key mapping) fill the $1^{st}$ n rows in the temporary fact table 312. When the E-fact table from the source Data Mart is processed, the results fill the subsequent rows in the temporary fact table 312. Thus, the destination warehouse will maintain only a single fact table for both uncompressed and compressed requests.

In a step 420, certain runtime metadata from the source Data Mart may need to be copied to the destination Data Mart in order maintain a proper state of the date warehouse across the conversion. In a step 422, deleted requests may be removed from the destination Data Mart. For example, when a request is deleted, typically the system will simply mark the request for later deletion. A separate clean up process typically is scheduled (e.g., once a week) to run through the Data Mart and update records and files to actually delete the data of the marked requests. During conversion, there may be requests marked for deletion that had not been actually deleted. This step 422 identifies any data copied to the destination Data Mart associated with marked request and removes the data from the destination Data Mart.

Figure 6:
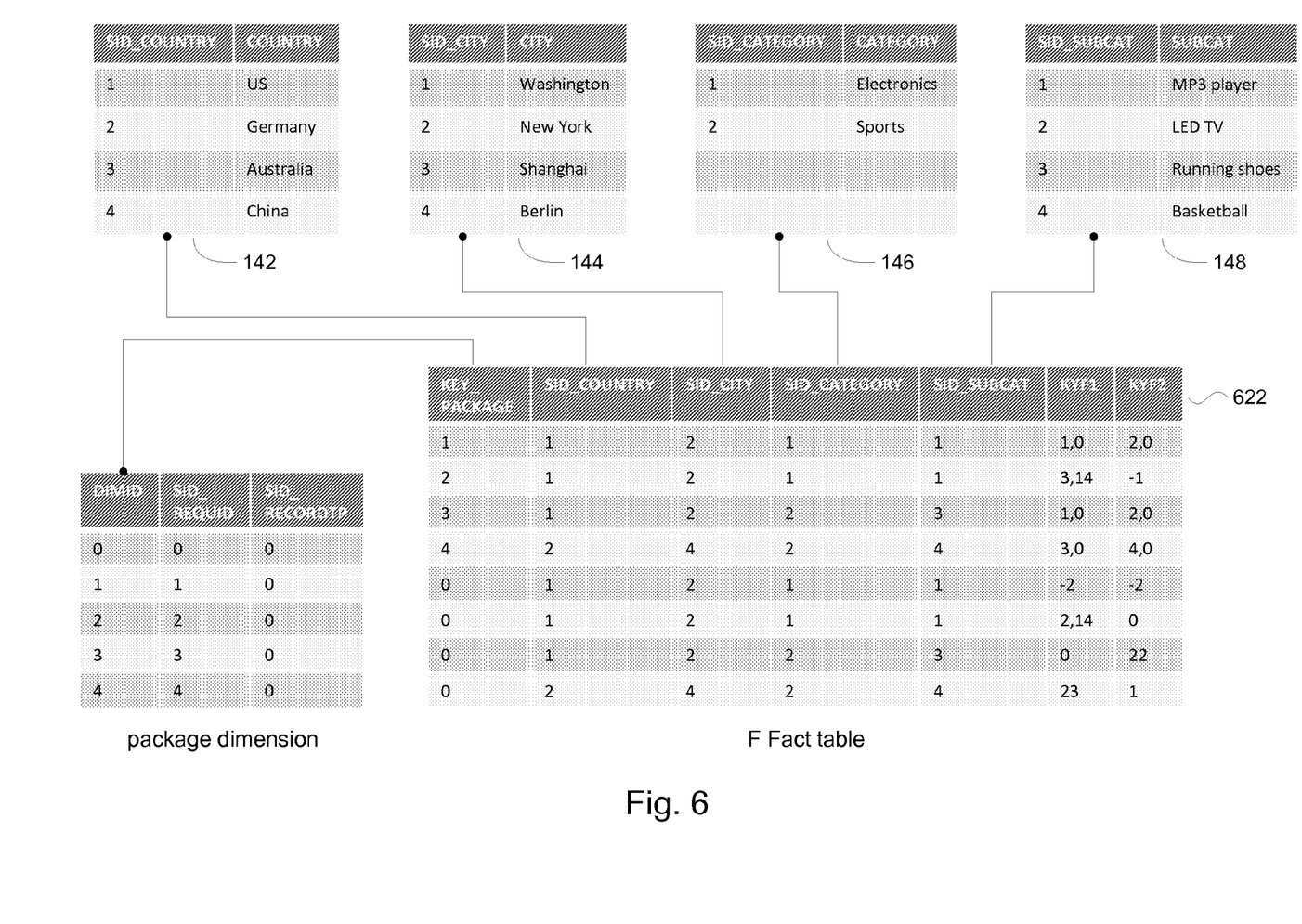
FIG. 6 illustrates an example of a star type schema that can result from converting a snowflake type schema in accordance with the present disclosure.

FIG. 6 illustrates an example of the destination Data Mart, converted over from the source Data Mart shown in FIG. 1A. A notable observation is the absence of the dimension tables 134 and 136. However, despite the elimination of the dimension tables 134, 136, the fact table 622 is still linked to the data tables 142-148 by virtue of the direct linkage from the fact table to the data tables.

Figure 7:
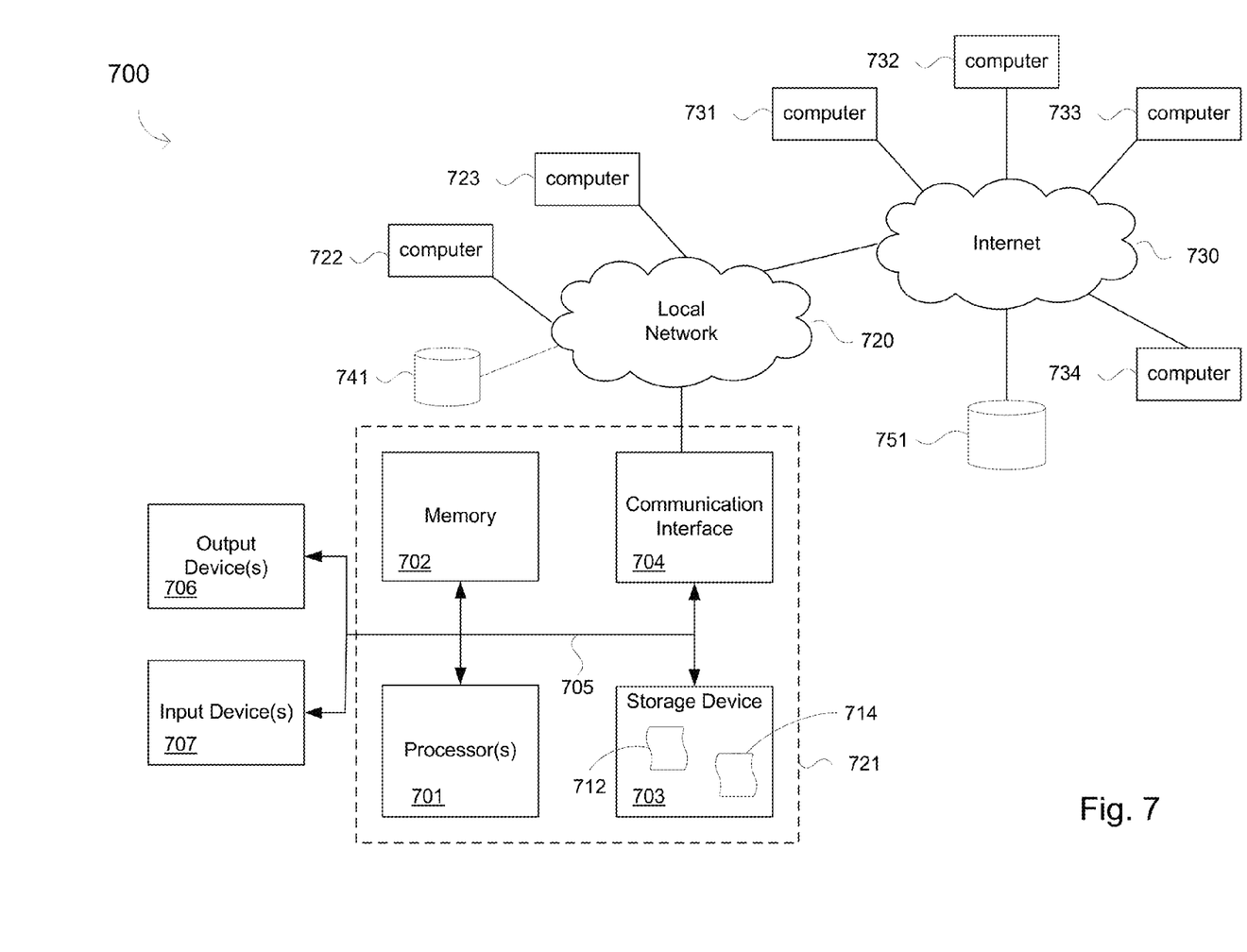
FIG. 7 is a high level block diagram of computing component embodiments of the present disclosure.

FIG. 7 is a block diagram of a system 700 according to some embodiments. The system 700 includes computers 721-723 and one or more storage systems 741 interconnected by a local network 720 such as a Local Area Network (LAN), a Wide Area Network (WAN), and the like. In some embodiments, the system 700 may include computers 731-734 and one or more storage systems 751 connected to the Internet 730. The local network 720 may be connected to the Internet 730.

Each computer (e.g., computer 721) may be configured as a general purpose computing apparatus and may execute program code to perform any of the functions described herein. For example, computer 721 may represent an embodiment of host computer systems 104 shown in FIG. 1.

Each computer (e.g., computer 721) includes, among its components, a processor component 701 (comprising one or more processing units) operatively coupled to a communication interface 704, a data storage device 703, one or more input devices 707, one or more output devices 706, and a memory 702. The communication interface 704 may facilitate communication on the local network to access other systems, such as storage system 741 for example.

Input device(s) 707 may include, for example, a keyboard, a keypad, a mouse or other pointing device, a microphone, knob or a switch, an Infra-Red (IR) port, a docking station, a touch screen, and so on. Input device(s) 707 may be used, for example, to enter information into the computer. Output device(s) 706 may include, for example, a display (e.g., a display screen), a speaker, a printer, and so on. Additional elements (not shown) may be included according to some embodiments.

The data storage device 703 may comprise any appropriate persistent storage device, including combinations of magnetic storage devices (e.g., magnetic tape, hard disk drives and flash memory), optical storage devices, Read Only Memory (ROM) devices, etc., while memory 702 may comprise Random Access Memory (RAM).

The data storage device 703 may store program code 712 which may be executed by the processor component 701 to cause the computer to perform any one or more of the processes and methods described herein. Embodiments are not limited to execution of these processes by a single apparatus.

The data storage device 703 may store data structures 714 such as object instance data, runtime objects, and any other data described herein. In an embodiment, for example the data storage device 703 may also store data and other program code for providing additional functionality and/or which are necessary for operation thereof, such as device drivers, operating system files, etc.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

Advantages and Technical Effect

The schema conversion of the present disclosure offers many benefits. Some main benefits include:
Simplified modeling: Dimensions from the schema of the source Data Mart which serve as grouping sets of characteristics are still available in the schema of the converted Data Mart. However, the grouping sets are metadata now. They do not impact the physical representation on the database any longer, and eliminate the need to design huge dimension tables with their corresponding negative impact on querying and loading performance.
Simplified re-modeling: Adding a new key figure to the schema of the converted Data Mart is simplified, since adding a column on a columnar storage is a very fast operation. But now it is also easy to move characteristics from one dimension to another dimension. This is a pure metadata change and can be accomplished without re-modeling, being performed directly on the underlying data of the schema.
Faster loading: The elimination of the dimension tables reduces the time to perform a data load because the cross-referencing and look up operations on dimension tables are no longer needed.

What is claimed is:

1. A method in a computer system for converting a Data Mart comprising a plurality of fact tables and a plurality of dimension tables, wherein the fact tables are linked to a plurality of data tables via the dimension tables, the method comprising:
a first computer sending an instruction to a plurality of host computers, wherein the fact tables are distributed among the host computers as source fact table fragments;
each host computer generating a new fact table fragment using its corresponding source fact table fragments by:
mapping dimension keys stored in the corresponding source fact table fragments to identify data table keys of the data tables using the dimension tables; and
storing the data table keys of the data tables in the new fact table fragment,
wherein the new fact table fragment is linked to the data tables via the data table keys in the new fact table fragment,
wherein new fact table fragments from each host computer constitute a new fact table of a converted Data Mart.

2. The method of claim 1 wherein the converted Data Mart is absent the dimension tables.

3. The method of claim 1 wherein the source fact table fragments in the host computer include an F-fact table fragment and an E-fact table fragment, wherein generating a new fact table fragment further includes combining the F-fact table fragment and the E-fact table fragment into the new fact table fragment.

4. The method of claim 1 further comprising the first computer identifying the dimension keys in the source fact tables of the Data Mart that are to be mapped.

5. The method of claim 4 further comprising the first computer identifying facts in the source fact tables of the Data Mart that are to be copied to the new fact table.

6. The method of claim 1 wherein the Data Mart further comprises a package dimension table, the method further comprising the first computer creating a new package dimension table by copying the package dimension table and associating the new package dimension table with the new fact table fragments.

7. The method of claim 1 wherein each host computer further copies data other than the dimension keys from the source fact table fragments to the new fact table fragment.

8. The method of claim 1 wherein each host computer further deletes data in the source fact table fragments that were marked for deletion from the new fact table fragment.

9. A computer system for a Data Mart comprising:
a plurality of host computers, wherein a source Data Mart comprising a plurality of fact tables is distributed among the host computers, each host computer having a fragment of source fact tables of the source Data Mart, the fragment of source fact tables storing dimension keys that point to a plurality of dimension tables of the source Data Mart, the fragment of source fact tables being linked to a plurality of data tables via the dimension keys,
wherein the host computers are configured to convert the source Data Mart to produce a converted Data Mart comprising a new fact table, wherein the new fact table comprises a plurality of new fact table fragments distributed among the host computers,
each host computer being configured to generate its corresponding new fact table fragment using its corresponding fragment of source fact table by:
mapping dimension keys stored in the corresponding fragment of source fact tables to identify data table keys of the data tables using the dimension tables; and
storing the data table keys of the data tables in the new fact table fragment, wherein the new fact table fragment is linked to the data tables via the data table keys in the new fact table fragment.

10. The computer system of claim 9 wherein the converted Data Mart is absent the dimension tables.

11. The computer system of claim 9 wherein the fragment of source fact tables in each host computer includes an F-fact table fragment and an E-fact table fragment, wherein generating a new fact table fragment further includes combining the F-fact table fragment and the E-fact table fragment into the new fact table fragment.

12. The computer system of claim 9 further comprising a first computer configured to identify the dimension keys in the source fact tables of the Data Mart that are to be mapped and send the dimension keys identified to each of the host computers.

13. The computer system of claim 12 wherein the first computer is further configured to identify facts in the source fact tables of the Data Mart that are to be copied to the new fact table and send the facts identified to each of the host computers.

14. The computer system of claim 12 wherein the source Data Mart further comprises a package dimension table, wherein the first computer is further configured to create a new package dimension table by copying the package dimension table and associating the new package dimension table with the new fact table fragments.

15. The computer system of claim 9 wherein each host computer further copies data other than the dimension keys from the source fact table fragments to the new fact table fragment.

16. The computer system of claim 9 wherein each host computer further deletes data in the source fact table fragments that were marked for deletion from the new fact table fragment.

17. A non-transitory computer-readable medium having stored thereon executable program code which when executed by a host computer causes the host computer to participate in converting a Data Mart comprising a plurality of fact tables and a plurality of dimension tables, wherein the fact tables are linked to a plurality of data tables via the dimension tables, wherein the fact tables are distributed among a plurality of host computers as corresponding source fact table fragments, the converting comprising steps of:

mapping dimension keys stored in the corresponding source fact table fragments to identify data table keys of the data tables using the dimension tables; and storing the data table keys of the data tables in the new fact table fragment, wherein the new fact table fragment is linked to the data tables via the data table keys in the new fact table fragment, wherein new fact table fragments from each host computer constitute a new fact table of a converted Data Mart.

18. The non-transitory computer-readable medium of claim 17 wherein the converted Data Mart is absent the dimension tables.

19. The non-transitory computer-readable medium of claim 17 wherein the source fact table fragments in the host computer include an F-fact table fragment and an E-fact table fragment, wherein generating a new fact table fragment further includes combining the F-fact table fragment and the E-fact table fragment into the new fact table fragment.

20. The non-transitory computer-readable medium of claim 17 wherein each host computer further copies data other than the dimension keys from the source fact table fragments to the new fact table fragment.

* * * * *